United States Patent [19]

Tanaka

[11] Patent Number: 4,461,518
[45] Date of Patent: Jul. 24, 1984

[54] SLIDING ROLLER BEARING
[75] Inventor: Kazuhiko Tanaka, Mino, Japan
[73] Assignee: Nippon Thompson Company, Ltd., Tokyo, Japan
[21] Appl. No.: 498,701
[22] Filed: May 27, 1983

Related U.S. Application Data

[63] Continuation of Ser. No. 258,478, Apr. 28, 1981, abandoned.

[30] Foreign Application Priority Data

May 7, 1980 [JP] Japan .............................. 55-61971[U]

[51] Int. Cl.³ ............................................. F16C 31/06
[52] U.S. Cl. .................................................. 308/6 C
[58] Field of Search ............. 308/6 R, 6 A, 6 B, 6 C, 308/3 R, 3 A

[56] References Cited

U.S. PATENT DOCUMENTS

| | | | |
|---|---|---|---|
| 2,947,581 | 8/1960 | Van Dorn et al. | 308/215 X |
| 3,230,018 | 1/1966 | Stallman | 308/6 C |
| 3,964,802 | 6/1976 | Pitner | 308/6 C |

Primary Examiner—Stuart S. Levy
Assistant Examiner—David Werner
Attorney, Agent, or Firm—L. Lawton Rogers, III

[57] ABSTRACT

A sliding roller bearing with guides for the bearings adjacent the track surface in the load zone and transition zone. The stepped rollers are formed by coaxial insertion of a hollow pin into a hollow roller and the track is exposed prior to assembly to facilitate machining.

18 Claims, 8 Drawing Figures

FIG.6
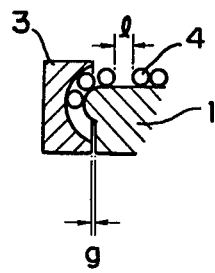
FIG.7 FIG.8
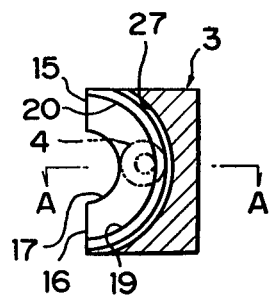 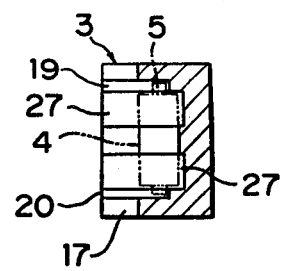

SLIDING ROLLER BEARING

RELATED APPLICATION

This application is a continuation of application Ser. No. 258,478 filed April 28, 1981, now abandoned.

BACKGROUND OF THE INVENTION

The present invention relates to a sliding roller bearing which is used when moving a movable portion of machine tools or other equipment rectilinearly in a precise manner.

A bearing device wherein numerous rollers roll in an elongated circular guide path formed by a track base and end caps is well known. The rollers have to be guided so that they roll correctly against the track surface. However, conventionally this type of bearing, which is provided only with retaining plates that contact the sides of the roller, cannot bear a load of large axial component force of the roller. Also there is proposed one which is provided by both retaining plates and guide plates which guide the lower surfaces of the roller. However, since such guide plates do not extend along the flat track surface up onto the curved surfaces of the end caps at both ends of the track base, a large frictional resistance exists at the curved surface portions, and thus accurate guiding is difficult.

It is accordingly an object of the present invention to obviate many of the deficiencies of the known prior art and to provide a novel sliding roller bearing structure. In the preferred embodiment, a hollow roller has a hollow pin for sustaining the roller, and thus a stepped roller is formed which increases load capacity. On the load side path of the roller, on both sides of the flat track surface and up onto the curved transfer portions of the end caps, there is provided a pair of guide plates having an external shape conforming to the locus of the internally moving hollow pin, thus permitting accurate guiding of the stepped rollers. The track base and the guide plates are made separately, thus allowing the surfaces contacting the rollers to be made with high accuracy and good surface finish at low manufacturing cost.

These and many other objects and advantages will be apparent from the claims and from the detailed description when read in connection with the drawings.

THE DRAWINGS

FIG. 6 is a schematic front view in partial cross-section showing the relation between the end surface of the track base and the end cap;

FIG. 7 is a front view in elevation and in longitudinal section of a second embodiment of the end cap of FIG. 1 through FIG. 5; and FIG. 8 is a section taken along lines A—A in FIG. 7.

THE DETAILED DESCRIPTION

Figure 1:
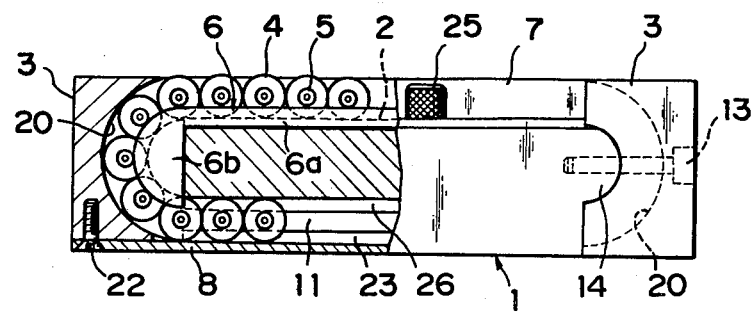
FIG. 1 is a front view in elevation and in partial section of one embodiment of the sliding roller bearing according to the present invention.
Figure 2:
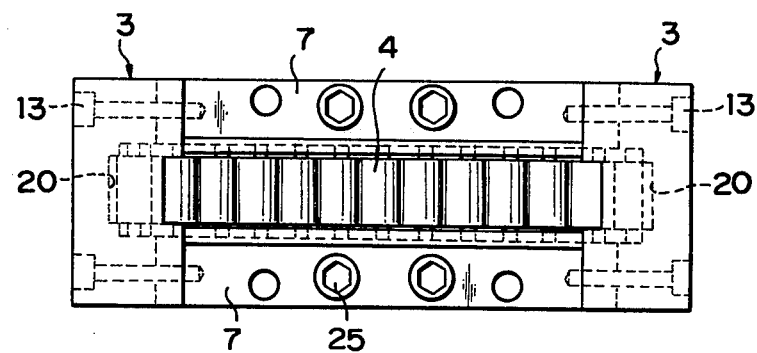
FIG. 2 is a top plan view of the bearing of FIG. 1.

FIG. 1 is a partially sectioned front view of the bearing according to the present invention, wherein 1 is a track base, 2 is a flat smooth track surface formed at the upper portion of the track base, 3 is an end cap which is mounted to both ends of the track base, 4 is a hollow stepped roller, 5 is a hollow pin inserted into the hollow portion of the hollow roller (for example, a spring pin or a roller sustaining pin), 6 is a guide plate for the hollow roller, 7 is a retaining plate disposed outside of the guide plate, and 8 is a cover plate secured beneath the track base.

Figure 3:
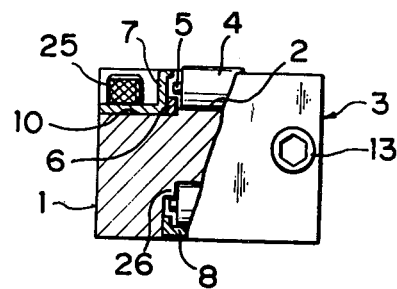
FIG. 3 is a side view in elevation and in partial section of the bearing of FIG. 1.

As shown in FIG. 3, track base 1 has substantially an inverted U-shaped cross section, and a track surface 2 at the upper portion which is the sliding surface for the load side bearing. Track base seat 10 is formed at both sides of the track surface 2 slightly lower thereof through shoulder 9 whereat said guide plate 6 makes close contact. At the lower portion of the track base, a no load side moving path 11 for the hollow rollers is formed. Curved transfer portions 12 at both ends of the track base 1 are formed by the end caps 3 for connecting the track surface 2 and the moving path 11. The end cap 3 is fixed to convex surfaces 14 at both ends of the track base by two bolts 13, 13, left and right respectively.

As shown in the side views of FIG. 1 and FIG. 5, the end cap 3 has a form so that upper and lower straight portions 15, 16 are connected by a central concave surface portion 17, while the end portion of the track base 1 has a straight portion 18 below said convex surface portion 14. The inner portion of the end cap 3 has a curved surface 20 which becomes the external wall of said transfer portion 12, and a stepped portion 19 is formed at the corners thereof for guiding the roller side surfaces.

As shown in FIG. 6, when the track base 1 and the end cap 3 are mated together by tightening bolt 13, a close contact is made between the convex surface portion 14 and the concave surface portion 17 and a slight gap g remains between the straight portion 18 on the track base and the straight portion 16 on the end cap. If tightening is made in such a manner that the straight portions 16 and 18 make close contact, the curved surface 20 will not be concentric with the curved surfaces on both ends of the track base due to deformation caused on the end caps, and variations occur on roller pitch circle length. If, on the other hand, the bolts are tightened at the locations on the curved surface portions, no deformation occurs at the curved portion of the end cap, and thus both of the curved surfaces will be precisely concentric permitting to maintain a uniform roller pitch circle length.

Figure 5:
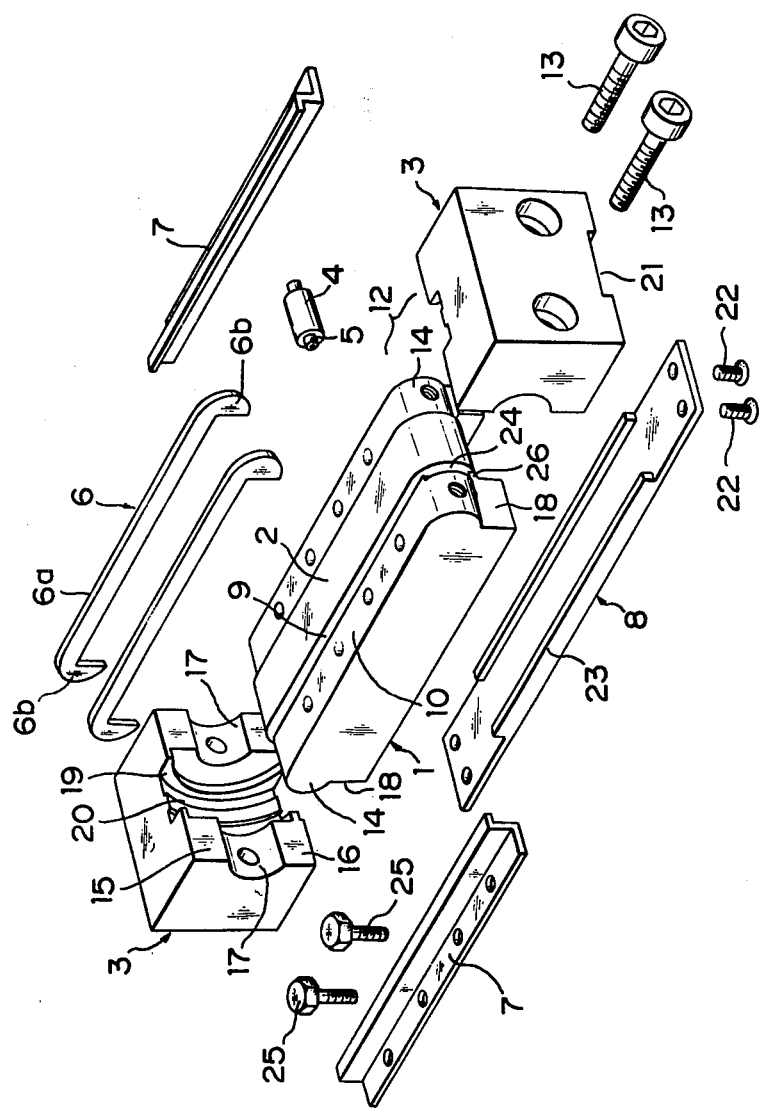
FIG. 5 is an exploded pictorial view of the bearing of FIG. 1 showing the assembly thereof.
Figure 4:
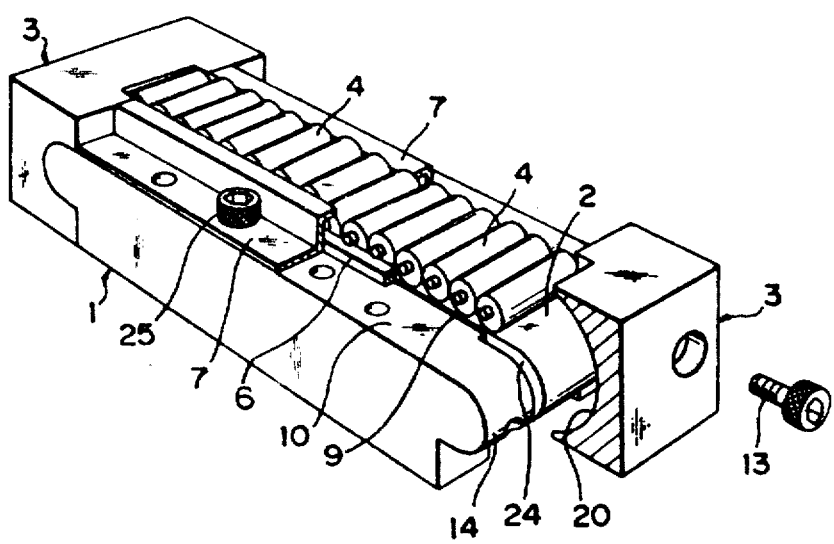

As shown in FIG. 1, FIG. 3 and FIG. 5, a cover plate 8 is secured beneath the moving path 11 of the track base 1. The cover plate 8 is inserted into recesses 21 at the bottom of the end caps 3, 3 and fixed by screws 22, 22, respectively. At both sides of the cover plate excluding both ends, protrusions 23, 23 are facing towards the moving path for guiding the no load rollers. Also, at the curved surface portion following the shoulder 9 of the track base 1, a cut portion or groove 24 is provided and the guide plate 6 is inserted thereto.

As shown in FIG. 1, the guide plate 6 has a configuration of integrally made horizontal portion 6a which extends along the shoulder 9 of the track base and a semicircular plate 6b which extends tangentially from the top end of the horizontal portion. The upperside of the horizontal portion 6a guides the side surface of the load side roller, and the semicircular plate 6b guides the side surface of the roller inside the transfer portion 12. Therefore, the guide plate, throughout said track surface and said transfer portion, forms the external shape conforming to the internal locus of the sustaining pin of the stepped roller. Further, at the track base seat 10 outside the guide plate 6, the retaining plate 7 having a Z shaped cross section is mounted by bolt 25.

In order to assemble the above bearing, the guide plate 6 is inserted onto the shoulder 9 and the cut portion of the groove 24 of the track base, the end caps 3 are brought towards both ends of the track base and using the bolt 13 tightened and fixed, and the cover plate 8 is disposed at the back side and fixed using the screw 22. After disposing a desired number of hollow, stepped rollers from the track surface 2 throughout the moving path 11 and the transfer portion 12, the retaining plate 7 is fixed outside the guide plate 6 by the bolt 25 to complete the entire assembly.

When assembled as above, the stepped rollers are guided at the side surfaces of the rollers by the horizontal portion 6a of the guide plate at the track base 2, and by the semicircular plate 6b at the transfer portion 12. Also the no load side rollers are guided at the side surfaces by the projection 23 on the cover plate inside the moving path 11. Therefore, the rollers are guided in a very orderly manner.

Since the guide plate extends from the load zone up onto the curved surface portions of both ends of the track base where a boundary of load and no load zone exists, frictional resistance is reduced and thus the rollers can be guided rectilinearly.

Because the guide plate 6 is fixed both by the shoulder portion of the track base and the retaining plate 7 and because a large contact surface with the roller is obtained, the construction is such that a load of large axial component force of the roller can be endured at the track surface.

Since the mounting surfaces of the end caps are fixed only with the curved surfaces of both ends of the track base, there are no variations in the roller pitch circle length, and thus, as shown in FIG. 6, the circumferential clearance can be made small, the number of rollers that can be assembled can be maximized and skewing can be prevented.

FIG. 7 and FIG. 8 show a modified example wherein circumferential grooves 27, 27 are provided at both sides of the curved surface 20 of the end cap. In this case, the inclination of the roller is allowed by grooves 27, 27 at both sides. Since the roller is guided at its central portion, the frictional resistance is reduced and at the same time will have the effect of a lubrication groove.

Since a stepped roller is formed by inserting a hollow pin into a hollow roller, the rollers can be manufactured at low cost, at the same time, the side surfaces of the roller which will have high accuracy can be used as the axial guide surfaces. Thus, a smooth rolling motion can be maintained. In comparison with the ordinary hollow rollers, load capacity is high.

As for misalignment of the bearing, a more uniform internal stress can be caused than in a bearing having a solid pin inserted into the hollow roller. Thus, an optimum crowning effect can be provided by changing the cross-sectional area of the hollow pin on the same roller.

By inserting the guide plate having semicircular plates at both ends of the horizontal portion onto the shoulder portion and the cut portions or the grooves on the track base, the track surface of the track base can be machined easily with high accuracy with respect to the mounting surface. Since the guide plate extends from the load zone to the curved surface portions at both ends of the track base where the boundary of load and no load zones exists, the rollers are guided in a very orderly manner and the frictional resistance is reduced. Since a large contact surface with the roller is obtained, a large load of axial component force of the roller can be endured. Further, since the track base and the guide plate are made separately, there are such effects that the surface contacting the rollers can easily be made with high accuracy, good surface finish and low manufacturing cost.

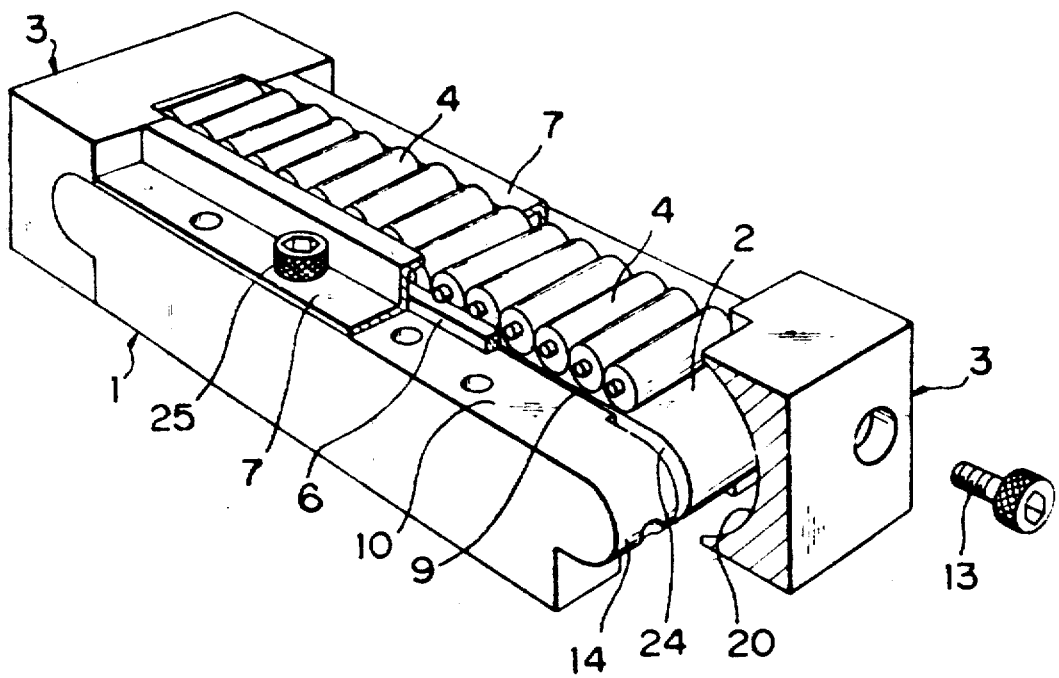

I claim:
1. A sliding roller bearing comprising:
   a base having an endless track surface from a load zone through a first transfer zone, a no-load zone and a second transfer zone back to said load zone, said track surface being disposed in a groove in said base in said no-load zone, said track surface being elevated above said base in said load zone and in said transfer zones;
   a plurality of stepped rollers each adapted to roll around said track surface; and
   a pair of guides carried by said base one on each longitudinal side of said endless track surface in position to provide lateral guides for said rollers when on said track surface in said load zone and in said transfer zones.

2. The bearing of claim 1 wherein said guides are carried by said base immediately adjacent said track surface to thereby provide a guide for said rollers on the track surface side of the axis of said rollers when positioned on said track surface.

3. The bearing of claim 2 wherein each of said rollers includes a hollow cylinder adapted to roll on said track surface and a relatively longer hollow pin carried coaxially within said roller and extending axially therefrom on both ends to thereby form a stepped roller.

4. The bearing of claim 3 including end caps secured to said base in a plane passing through the approximate center of said transition zones parallel to the planes of said endless track surface in said load and noload zones for guiding said rollers while in said transfer zones.

5. The sliding roller bearing of claim 4, wherein said end caps are provided with oil grooves at both sides of a curved transfer portion cooperating with said track surface in said transfer zones.

6. The sliding roller bearing of claim 7, wherein each of said plurality of rollers is a stepped roller comprising a hollow cylindrical roller and a relatively longer hollow pin coaxially inserted therein to protrude axially therefrom at both ends.

7. The sliding roller bearing of claim 1 including end caps secured to said base in a plane passing through the approximate center of said transition zones parallel to the planes of said endless track surface in said load and no-load zones for guiding said rollers while in said transfer zones.

8. The sliding roller bearing of claim 7, wherein said end caps are provided with oil grooves at both sides of a curved transfer portion cooperating with said track surface in said transition zones.

9. sliding roller bearing comprising:

a base having an endless track surface from a load zone through a transfer zone, a no-load zone and a second transfer zone back to said load zone;

a plurality of stepped roller each adapted to roll around said track surface; and a pair of guides carried by said base one on each longitudinal side of said endless track surface in position to provide lateral guides for said rollers when on said track surface in said load zone and in said transition zones, said guides being carried by said base adjacent said track surface to thereby provide a guide for said rollers on the track surface side of the locus of the axis of said rollers when rolled around said endless track surface.

10. The sliding roller bearing of claim 9, wherein each of said plurality of rollers is a stepped roller comprising a hollow cylindrical roller and a relatively longer hollow pin coaxially inserted therein to protrude axially therefrom at both ends.

11. The sliding roller bearing of claim 9, wherein said end caps are secured to said base in a plane passing through the approximate center of said transition zones parallel to the planes of said endless truck surface in said load and no-load zones.

12. The sliding roller bearing of claim 11, wherein said end caps are provided with oil grooves at both sides of a curved transfer portion cooperating with said track surface in said transfer zones.

13. A sliding roller bearing comprising:
a base having an endless track surface from a load zone trough a first transfer zone, a no-load zone and a second transfer zone back to said load zone, said track surface being disposed in a groove in said base in said no-load zone, said track surface being elevated above said base in said load zone and in said transfer zones;

a plurality of rollers each adapted to roll around said endless track surface; and guide means carried by said base in position to provide lateral guides for said rollers when on said track surface in said load zone.

14. The bearing of claim 13, wherein said guide means is carried by said base in position to provide a guide for said rollers on the track surface side of the axis of said rollers when positioned on said track surface.

15. The bearing of claim 13, wherein said guide means includes a pair of elongated guide members carried by said base one on each longitudinal side of said elevated track surface immediately adjacent said elevated track surface at the lateral sides thereof.

16. A sliding roller bearing comprising:
a base having an endless track surface from a load zone through a first transfer zone, a no-load zone and a second transfer zone back to said load zone, said track surface being disposed in a groove in said base in said no-load zone, said track surface being elevated above the entirety of said base in said load zone;

a plurality of rollers each adapted to roll around said endless track surface; and guide means carried by said base in position to provide lateral guides for said rollers when on said track surface in said load zone.

17. A sliding roller bearing comprising:
a base having an endless track surface from a load zone through a first transfer zone, a no-load zone and a second transfer zone back to said load zone, said track surface being disposed in a groove in said base in said no-load zone, said track surface being elevated in said load zone and in said transfer zones above the highest planar surface of said base;

a plurality of rollers each adapted to roll around said endless track surface; and guide means carried by said base in position to provide lateral guides for said rollers when on said track surface in said load zone.

18. A sliding roller bearing comprising:
a generally U-shaped base with a lateral portion and two generally parallel legs;

said base having an endless track surface from a load zone through a first transfer zone, a no-load zone and a second transfer zone back to said load zone;

said track surface being disposed between the legs of said base in said no-load zone and being elevated above said lateral portion in said load zone;

a plurality of stepped rollers around said track surface; and a pair of guides carried by said base one on each longitudinal side of said endless track surface in position to provide lateral guides for said rollers when on said track surface in said load zone.

* * * * *

UNITED STATES PATENT AND TRADEMARK OFFICE
CERTIFICATE OF CORRECTION

PATENT NO. : 4,461,518

DATED : July 24, 1984

INVENTOR(S) : Kazuhiko Tanaka

It is certified that error appears in the above-identified patent and that said Letters Patent is hereby corrected as shown below:

The title page showing the illustrative figure should be deleted to appear as per attached title page.

Figure 4:
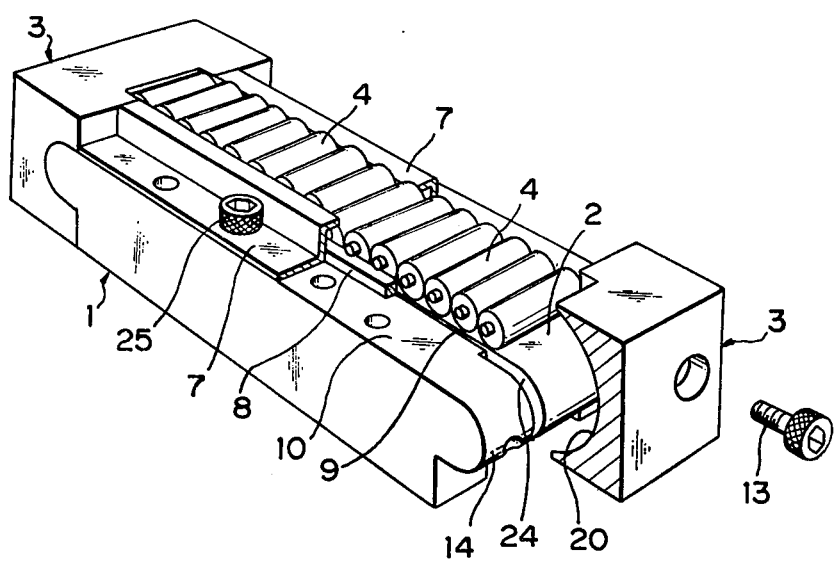
FIG. 4 is a partially exploded pictorial view of the bearing of FIG. 1.

Figure 4, should appear as shown on the attached sheet.

Signed and Sealed this

Nineteenth Day of February 1985

[SEAL]

Attest:

DONALD J. QUIGG

Attesting Officer

Acting Commissioner of Patents and Trademarks

United States Patent [19]

Tanaka

[11] Patent Number: 4,461,518
[45] Date of Patent: Jul. 24, 1984

[54] SLIDING ROLLER BEARING

[75] Inventor: Kazuhiko Tanaka, Mino, Japan

[73] Assignee: Nippon Thompson Company, Ltd., Tokyo, Japan

[21] Appl. No.: 498,701

[22] Filed: May 27, 1983

Related U.S. Application Data

[63] Continuation of Ser. No. 258,478, Apr. 28, 1981, abandoned.

[30] Foreign Application Priority Data

May 7, 1980 [JP] Japan .................. 55-61971[U]

[51] Int. Cl.³ .................................. F16C 31/06
[52] U.S. Cl. .................................... 308/6 C
[58] Field of Search ............ 308/6 R, 6 A, 6 B, 6 C, 308/3 R, 3 A

[56] References Cited

U.S. PATENT DOCUMENTS

| | | | |
|---|---|---|---|
| 2,947,581 | 8/1960 | Van Dorn et al. | 308/215 X |
| 3,230,018 | 1/1966 | Stallman | 308/6 C |
| 3,964,802 | 6/1976 | Pitner | 308/6 C |

Primary Examiner—Stuart S. Levy
Assistant Examiner—David Werner
Attorney, Agent, or Firm—L. Lawton Rogers, III

[57] ABSTRACT

A sliding roller bearing with guides for the bearings adjacent the track surface in the load zone and transition zone. The stepped rollers are formed by coaxial insertion of a hollow pin into a hollow roller and the track is exposed prior to assembly to facilitate machining.

18 Claims, 8 Drawing Figures